United States Patent

[11] 3,558,922

[72] Inventor James H. Galloway
Utica, Mich.
[21] Appl. No. 713,475
[22] Filed Mar. 15, 1968
[45] Patented Jan. 26, 1971
[73] Assignee General Electric Company
a corporation of New York

[54] FULL WAVE PHASE CONTROL INTEGRATED CIRCUIT
11 Claims, 8 Drawing Figs.

[52] U.S. Cl. ........................................................ 307/252,
307/228, 307/235, 307/262, 307/303, 328/150,
328/155
[51] Int. Cl. ........................................................ H03k 17/56
[50] Field of Search ............................................ 307/252,
303, 262, 235, 244, 246, 228, 265; 328/155, 146,
147, 150, 183, 185

[56] References Cited
UNITED STATES PATENTS

| | | | |
|---|---|---|---|
| 2,909,676 | 10/1959 | Thomas ........................ | 307/228X |
| 3,336,531 | 8/1967 | Yamada ........................ | 328/155 |

*Primary Examiner*—Stanley T. Krawczewicz
*Attorneys*—Robert J. Mooney, Nathan J. Cornfeld, Frank L. Neuhauser, Oscar B. Waddell and Melvin M. Goldenberg

ABSTRACT: A semiconductor trigger-signal-generating circuit is provided for applications such as full-wave phase control of AC power to a load through a trigger-signal-responsive semiconductor switch. The circuit is particularly suitable for operating directly off an AC supply such as a 60 hertz AC line, and in a preferred embodiment is a semiconductor monolithic integrated circuit.

INVENTOR:
JAMES H. GALLOWAY,
BY Robert J. Mooney
HIS ATTORNEY.

INVENTOR:
JAMES H. GALLOWAY,

BY Robert J. Mooney
HIS ATTORNEY.

INVENTOR:
JAMES H. GALLOWAY,
BY Robert J. Mooney
HIS ATTORNEY.

FULL WAVE PHASE CONTROL INTEGRATED CIRCUIT

The present invention relates to improvements in semiconductor circuits for producing trigger signals particularly suitable for operating a trigger-signal-responsive semiconductor switch, such as a thyristor, at a controllable phase angle relative to an AC supply. More particularly, the invention relates to an improved semiconductor circuit, which may preferably be of monolithic integrated form and is operable directly from a source of AC electric power, for controlling the supply of such power to a load by full-wave time-ratio proportional control of one or more thyristors. The invention is particularly suitable for providing full-wave phase control regulation of AC power supplied to a resistive or inductive load through a bidirectional thyristor.

One object of the present invention is to provide an improved semiconductor circuit which is particularly suited for full-wave phase control of a bidirectional thyristor.

Another object is to provide such a circuit which is relatively inexpensive, and which can provide convenient and reliable variation of power applied to a load over a wide range such as essentially 100 percent of the full range of available power.

Another object is to provide a circuit of the foregoing character which can be operated directly from an AC power source.

Another object is to provide such a circuit of which all the elements except those which it may be desired to vary for different end uses are completely integratable in monolithic semiconductor form.

Another object is to provide an improved circuit of the forgoing character especially suitable for full-wave low cost power and speed control of AC induction Motors.

Another object is to provide such a circuit which is capable of full-wave phase-type proportional control of power applied to resistive or nonsaturable reactive loads.

Another object is to provide such a circuit which includes built-in protection for a thyristor or thyristors controlled thereby.

These and other objects of the present invention will be apparent from the following description and the accompanying drawings in which.

Figure 1:
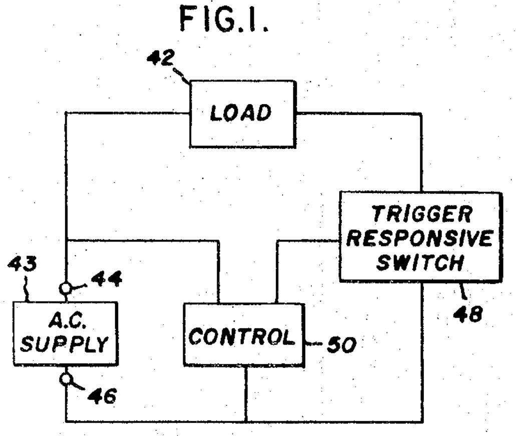
FIG. 1 is a block diagram of the basic elements of a power control system to which the present invention is applicable.

Referring to the block diagram of FIG. 1, the semiconductor control circuit shown by block 50, and which may be constructed according to the present invention, controls the application of power to a load 42 from an AC supply 43 having terminals 44, 46. Load 42 may be, for example, a restrictive load, or a resistive-inductive load such as a single-phase AC induction motor, for example of the permanent capacitor-split phase type, or shaded-pole type. For desirably effective response to phase-controlled variations of applied power, the speed-torque characteristics of such a motor should preferably be strongly sensitive to variations in average value of voltage supplied to the motor. Since the circuit of the present invention is capable of controlling the phase angle of applied power in each half-cycle over essentially the full range of 0° to 180°, with consequent variation of the speed of such a motor over essentially 100 percent of its range, to accommodate extremely low speeds such a motor may desirably have ball bearings rather than sleeve bearings.

Load 42 receives its power from the AC line source 43 through a switch 48 which is shown as a trigger-signal-controlled semiconductor switch. As will hereinafter be more fully described, switch 48 may consist of a pair of unidirectional semiconductor thyristors connected in inverse parallel relation, or conveniently may consist of a single semiconductor bidirectional thyristor, the latter being hereinafter called a "triac." A detailed description of both triacs and inverse-parallel-connected unidirectional thyristors is given in chapters 6, 7 and 8 of the GE SCR Manual, Fourth Edition, Copyright 1967 by the General Electric Company. Full-wave time-ratio proportional control of the power to load 42 is provided, with a control circuit 50 according to the present invention, by actuating switch 48 to the ON or conducting state at a selected and variable time, or phase angle, in each half cycle of the alternating current supply from terminals 44, 46. This control of triac 48 is provided by the timing, in each such half cycle, of a switch trigger signal generated by the circuit 50 of the present invention.

To facilitate understanding of the details of circuits constructed according to the present invention, the operation of one such circuit in terms of the block diagram of FIG. 2 will first be explained as follows. An input signal at terminal 12, which may be for example the output voltage of a potentiometer, thermistor, tachometer generator, or other voltage magnitude which is the analogue of a desired control setting, has its magnitude converted proportionately to time as represented by a portion of each half cycle of the AC supply within a phase angle P. This conversion is accomplished by means of the converter subcircuit shown in block form at 18, interacting with a reference voltage generating subcircuit shown by block 20 and a comparator subcircuit shown by block 22. The result of this magnitude-to-time conversion is the generation of an output signal from comparator 22 in each half-cycle of the AC supply, which output signal appears at 24 and has a phase angle relative to the beginning of its half-cycle which varies in accordance with variations in the magnitude of the input control signal at 12.

One suitable type of magnitude-to-time converter subcircuit 18 is a ramp-and-pedestal voltage generating circuit. Circuits of the ramp-and-pedestal type for converting magnitude to time are well known to those skilled in the art, and are described in detail, for example, in Section 9.5.2 of the GE SCR Manual, Fourth Edition. Briefly, such circuits serve to generate a voltage wave form synchronized with a half-cycle of an AC supply. The generated waveform consists of a generally saw-tooth-shaped ramp portion having an instantaneous amplitude which varies with time during the half-cycle, and a pedestal portion of effectively constant amplitude during the half-cycle. The amplitude or magnitude of the pedestal is caused to change responsive to the input signal, and this changes the time, or phase angle, in the half-cycle when the sum of the ramp voltage and pedestal voltage equals a given reference voltage. The comparator circuit 22 senses the difference between the reference voltage at 20 and the ramp-and-pedestal voltage, and when the two are equal, the comparator is arranged to produce an output signal, whose phase angle in the half-cycle is thus proportional to input signal magnitude.

When switch 48 is a triac, it is normally unable to respond to a trigger signal unless there is sufficient voltage across the triac at the time of the trigger signal. This may not be the case sometimes, for example when load 42 is sufficiently inductive that appreciable lagging current is still flowing through it and the triac even though the line voltage has reached the zero amplitude point of its sine wave. To prevent a trigger signal from being applied to triac 48 under such conditions, a lockout circuit or gate shown by block 26 is provided. The lockout circuit 26 prevents the comparator 22 from generating an output signal at 24 for keying the trigger signal or triac firing-pulse generator circuit shown by block 28. The lockout circuit 26 thereby prevents a trigger signal from reaching the triac unless the triac is sufficiently turned off, or nonconducting, and has sufficient voltage across it to turn on, or conduct, responsive to the trigger signal.

Figure 2:
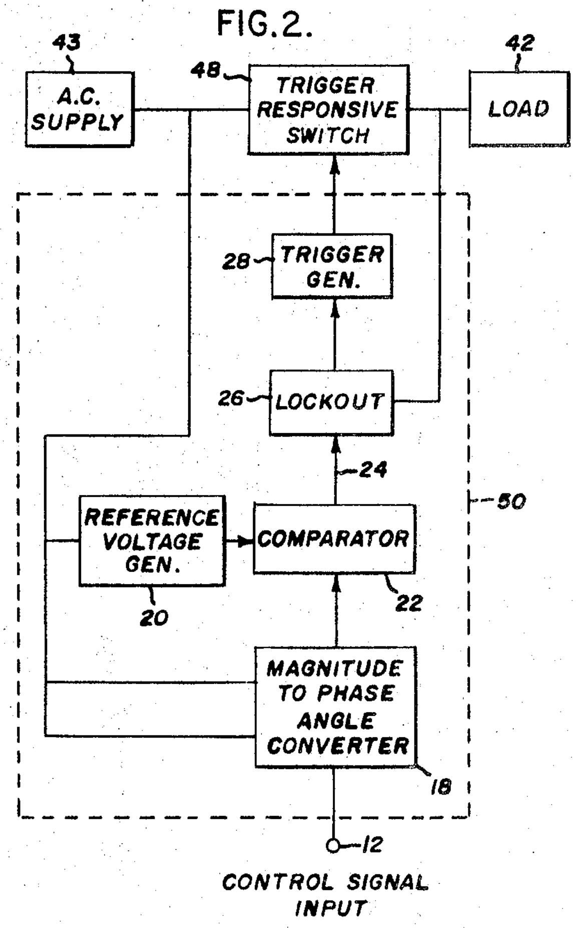
FIG. 2 is a block diagram showing the relationship to the power control system of FIG. 1 of the elements of one exemplary embodiment of a semiconductor power control circuit constructed according to the present invention.
Figure 3:
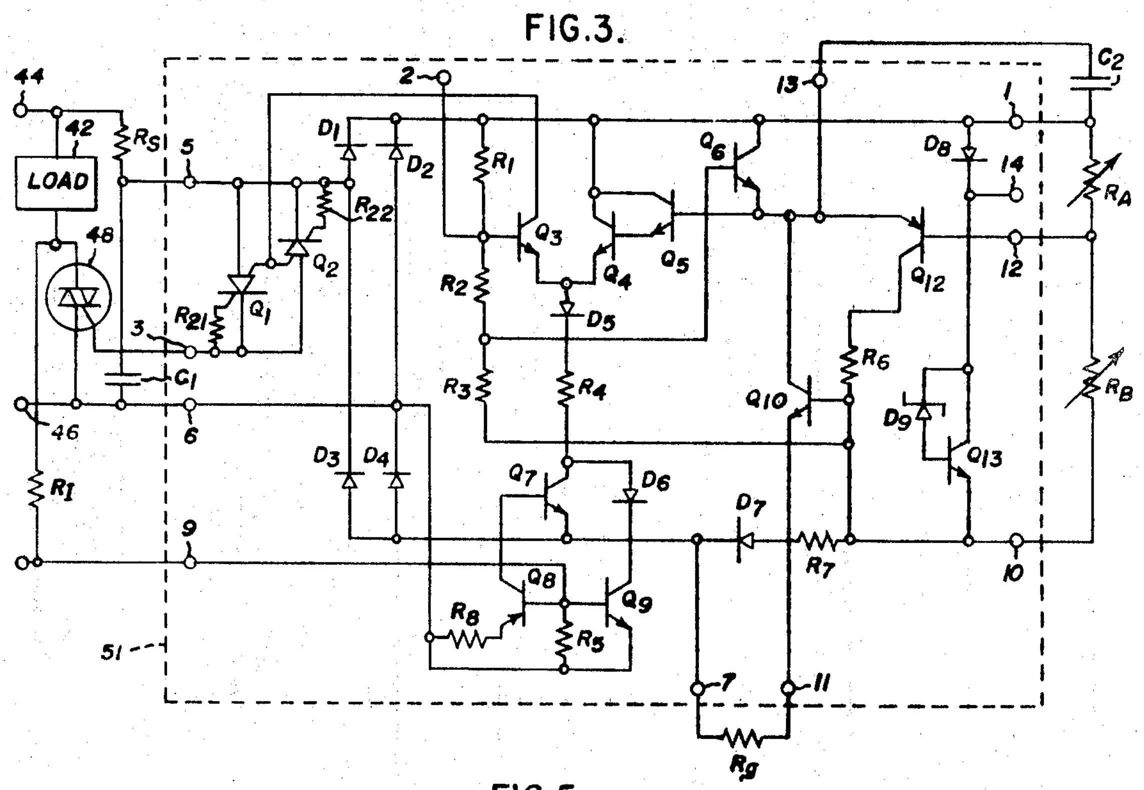
FIG. 3 is a schematic diagram of a semiconductor power control circuit constructed according to the present invention and connected in a power control application in the manner shown in FIG. 2.

Turning to FIG. 3, there is shown a schematic diagram of one exemplary embodiment of a semiconductor circuit constructed according to the present invention. For easy understanding, the circuit of FIG. 3 will now be described with reference to the block diagram of FIG. 2. Operating supply voltage for the circuit of FIG. 3 is connected to circuit terminals 5 and 6 directly from supply terminals 44 and 46 of the AC line, which may for example be a 60 hertz 120 volt supply. Triac 48 is connected in series with load 42 across terminals 44 and 46. A capacitor C1, for storing energy for firing triac 48, is connected across terminals 5 and 6. Between terminals 5 and 44 is a current-limiting resistor $R_S$. Another resistor $R_l$ is connected between terminal 9 and the common point of triac 48 and load 42. A ramp voltage slope-controlling resistor $R_g$ is connected across terminals 7 and 11.

From terminals 5 and 6 the AC supply is connected through the current-limiting resistor $R_S$ to a full-wave bridge rectifier provided by diodes D1, D2, D3 and D4 connected as shown. The bridge rectifier output is a full-wave-rectified sine wave voltage which collapses to zero voltage during line voltage zero crossings of the AC supply. The bridge rectifier output is clipped to provide a reference DC voltage level by Zener diode D9 and transistor Q13 connected as shown. Diode D8 in series with Zener diode D9 provides temperature compensation for D9. In each half-cycle of current supplied from the bridge rectified to terminal 1, transistor Q13 is held off until Zener breakdown voltage is established across diode D9. Then transistor Q13 conducts until the voltage at terminal 1 drops below the Zener voltage of diode D9, thus providing a reference DC voltage at terminal 1 that, during the majority of each half-cycle of the AC supply, is clamped at a value equal to the Zener voltage of D9 plus the base-emitter diode drop of Q13. The full-wave-rectified and Zener-clipped-waveform appears between terminals 1 and 10, with terminal 1 being DC positive relative to terminal 10, and is the supply for the ramp-and-pedestal voltage generator 18 and the reference voltage generator 20. Resistor R7 and diode D7 complete a circuit return path to bridge rectified D3 and D4.

Series connected variable resistors $R_A$, $R_B$ form a voltage divider across terminals 1, 12 and 10 as shown. The voltage developed across a selected one of either $R_A$ or $R_B$ provides the analogue of the magnitude of the desired input signal. For example, if load 42 is an induction motor, $R_B$ may be manually controlled potentiometer whose manual resistance variation will control the firing angle of the triac 48 in each half-cycle of the AC supply and thereby control the applied power and resultant speed of the motor constituting load 42.

Figure 4:
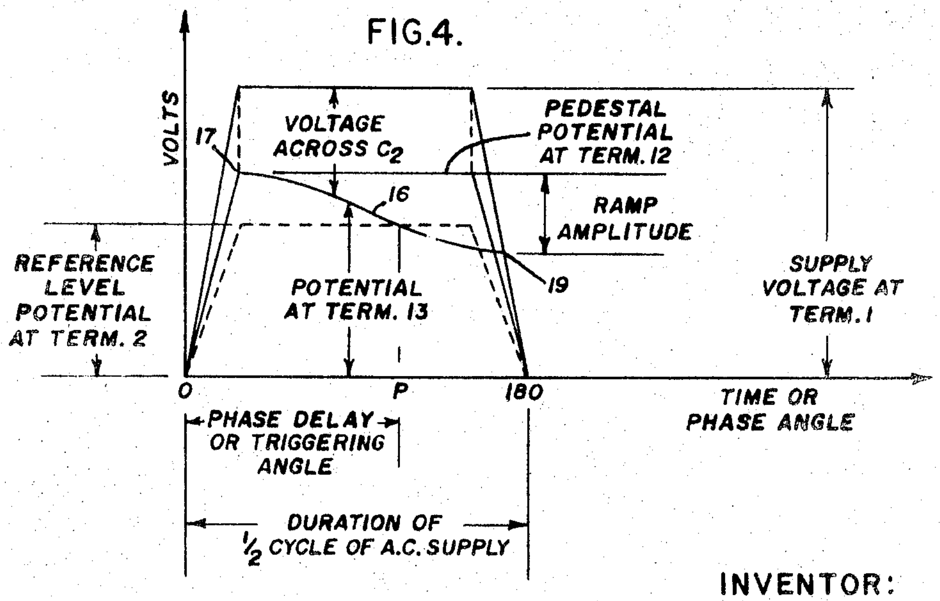
FIG. 4 is a graphical illustration of certain exemplary voltage waveforms associated with the circuit of FIG. 3.

Capacitor C2, resistor R6, resistor $R_G$ and transistors Q10 and Q11 connected as shown in FIG. 3 constitute the ramp-and-pedestal subcircuit corresponding to block 18 of FIG. 2. The operation of this subcircuit will be most easily understood with reference to the voltage waveforms of FIG. 4, wherein it will be evident that in each half-cycle of the AC supply at terminals 5 and 6 a DC voltage from the voltage divider $R_A$, $R_B$ charges the timing capacitor C2 negatively relatively rapidly to a pedestal voltage level at terminal 12 equal to the fraction $\frac{R_A}{R_A+R_B}$ times the voltages at terminal 1. The pedestal voltage level is shown at point 17 in FIG. 4 and is determined by the setting of $R_B$ relative to $R_A$. Thereafter in the same half-cycle, capacitor C2 is further negatively charged along curve 16 by the half-sine-wave current from terminal 1 through transistor Q10 and resistor $R_g$ to terminal 7. This further charging current for capacitor C2 causes curve 16 of FIG. 4 to constitute a cosine-shaped ramp, and because this current is controlled by the external emitter resistor $R_G$ of transistor Q10, $R_Q10$, provides a control for determining and adjusting the slope and amplitude of ramp 16. Because of the sine wave shape of the supply current through transistor Q10, the ramp has a cosine wave-shaped top as shown in FIG. 4. This sine wave-shaped current for charging C2 is obtained from the voltage drop of supply current through $R_7$, applied as a base drive to transistor Q10. Diode D7 compensates for the base-emitter voltage of transistor Q10 to insure that the current through R9 has the same sinusoidal shape as the current through $R_7$.

Thus in the ramp-and-pedestal circuit described above, the capacitor C2 in each half-cycle charges rapidly to a voltage, as shown at 17 in FIG. 4, equal to the DC supply voltage at terminal 1 less the sum of the emitter-base diode drop through transistor Q12 and the pedestal voltage level determined by the setting of $R_B$ relative to $R_A$. Thereafter the capacitor C2 further charges along curve 16 of FIG. 4 toward a total ramp voltage shown at 19 in FIG. 4. Thus it will be evident that the instantaneous algebraic sum of ramp voltage and pedestal voltage, shown by curve 16, can be caused to equal a fixed reference voltage at a time, or phase angle, in each half-cycle, dependent on the setting of $R_B$ relative to $R_A$. Responsive to this condition of equality, the comparator circuit corresponding to block 22 of FIG. 2 generates an output signal for controlling firing of triac 48.

The comparator circuit corresponding to block 22 is constituted by transistors Q3, Q4 and Q5, resistor R4 and diode D5, connected as shown. In each half-cycle the comparator circuit compares the ramp-and-pedestal voltage 16 at terminal 13 with the output at terminal 2 of a reference voltage generator corresponding to block 20 in FIG. 2 and consisting of series-connected voltage divider resistors $R_1$, $R_2$, and $R_3$ connected between terminals 1 and 10 as shown. This reference voltage is available at terminal 2 and can be modified if desired by supplemental inputs at terminal 2. Transistors Q3 and Q4 function as a differential amplifier which compares the voltage at terminal 13 to that of terminal 2 through each half-cycle of the AC supply, this differential amplifier action providing inherent compensation for effects of temperature changes on various elements of the total circuit. The darlington connection of transistors Q4 and Q5 has the advantage of presenting a high impedance to the timing capacitor C2 and also provides an extra base-emitter voltage offset to compensate for the base-emitter drop of the pedestal emitter-follower transistor Q12. Thus the voltage across $R_B$ required at terminal 12 to trigger the triac 48 either in the absence of any ramp voltage or at the very beginning of the ramp is essentially the same as the reference voltage at terminal 2, differing from it only by the relatively tiny differences in base-emitter diode voltage drops of transistors Q3, A4, A5 and Q12.

The common mode current of the differential comparator 22, through diode $D_5$ and resistor $R_4$, is connected as shown to terminal 7, the DC negative output terminal of the bridge rectifier, through transistor $Q_7$. Transistor Q7 is a part of the lockout subcircuit corresponding to block 26 of FIG. 2. This lockout circuit consists of diode D6, transistors Q7, Q8, Q9, resistors R5, R8 and resistor $R_1$, all connected as shown. In the operation of the lockout circuit, when load current is flowing through the triac 48, or when for any reason there is insufficient voltage across the triac to enable it to be fired responsive to a trigger signal at terminal 3, there is also insufficient voltage across $R_5$ for base drive of transistors Q8 or Q9. This prevents turning on of transistor Q7 and conduction of the common mode current of the comparator 22, thereby disabling the comparator 22 from producing an output signal, as shown at 24, for initiating triggering of the triac 48. The lockout circuit thereby prevents triac firing energy stored in capacitor C1 from being dissipated when the triac 48 is unable to respond to the triggering signal, as for example when there is insufficient voltage across the triac for firing it or when load 42 is sufficiently inductive that lagging current is still flowing through the triac even though a new half-cycle of the voltage wave from the AC supply has begun. However, when the triac 48 is off, or nonconducting, and line voltage appears across it, then current through resistor $R_I$ provides base drive to turn on transistors Q8, Q9 and Q7, and permitting flow of common mode current and hence enabling the differential comparator. The value of $R_I$ determines the amount of voltage across the triac 48 required to enable the comparator 22. If it is desired to eliminate the lockout circuit, as for example when load 42 is essentially entirely resistive, transistors Q7, Q8 and Q9, diode D6 and resistors R5, R8 and $R_I$ may be eliminated, and resistor R4 connected directly to terminal 7.

When comparator 22 is not disabled by the lockout circuit 26, as the potential of terminal 13 climbs each half-cycle initially to a level corresponding substantially to that of terminal 12 and then declines during ramp-charging of C2 as shown in FIG. 4 to a level where it equals the reference potential at terminal 2, the emitter potential of transistor Q4 is lowered by emitter follower action and transistor Q3 begins to conduct.

The resulting signal generated at the collector of Q3 keys the bilateral switch constituted by two PNPN inverse-parallel-connected SCS controlled switches Q1, Q2, the latter being a part of the trigger generator subcircuit shown by block 28 of FIG. 2. As shown, the anode of Q1 and the cathode of Q2 are connected to terminal 5, the cathode of Q1 and anode of Q2 are connected to terminal 6, the anode gates of Q1 and Q2 are connected to the collector of Q3, resistor $R_{21}$ connects the cathode of Q1 to terminal 3, and resistor $R_{22}$ connects the cathode of Q2 to terminal 5. In operation Q1 turns on responsive to the gate signal from collector of Q3 when terminal 5 is positive, and Q2 similarly turns on when terminal 5 is negative. Controlled switches of the SCS type are PNPN devices known to the art for providing, when connected in inverse parallel, a symmetrical bidirectional triggering function, and are described in detail in chapter 16 of the GE Transistor Manual, Seventh Edition, Copyright 1964. The SCS is also the subject of a copending U.S. Pat. application Ser. No. 333,478 filed Dec. 26, 1963 and assigned to the assignee of the present application.

Firing of the appropriate half of bilateral switch Q1, Q2 discharges capacitor C1 into the gate of triac 48 and thereby causes triac 48 to conduct. Since the triggering pulses from the bilateral switch Q1, Q2 alternate with the same polarity as the AC line voltage at terminals 44, 46, these trigger pulses are well suited for triggering a triac 48 directly, or triggering pairs of inverse-parallel-connected unidirectional thyristors through, for example, a pulse transformer.

To reset timing capacitor C2 to a fixed level at the end of each half-cycle, transistor Q6 is provided, connected to terminals 1 and 13 and the common point of resistors R2 and R3 as shown. In operation, transistor Q6 is biased off by divider resistors $R_1$, $R_2$ and $R_3$ until the supply voltage half-cycle declines to near zero amplitude. The voltage on capacitor C2 then provides a base drive to transistor Q6, thereby discharging capacitor C2 to a level corresponding to the base-emitter voltage drop of transistor Q6.

It will be apparent from the foregoing description that in accordance with the present invention an improved semiconductor trigger-signal-generating circuit is provided wherein an output pulse for firing a trigger-signal-controlled semiconductor switch such as a triac is provided in each half-cycle of an AC supply, at a phase angle in such half-cycle which varies in accordance with the magnitude of an input signal.

Exemplary values and types for the components of the circuit of FIG. 3, from which an operable embodiment of the circuit has been constructed, are as follows:

| | Ohms, K | Diodes | Type | Transistors | Type |
|---|---|---|---|---|---|
| Resistors: | | | | | |
| $R_A$ | 10 | $D_1$ | 1N4152 | | |
| $R_B$ | 10 | $D_2$ | 1N4152 | | |
| $R_I$ | 50–200 | $D_3$ | 1N4152 | $Q_3$ | 2N3414 |
| $R_S$ | 10–50 | $D_4$ | 1N4152 | $Q_4$ | } D16P |
| $R_G$ | 10–100 | $D_5$ | 1N4152 | $Q_5$ | } D16P |
| $R_1$ | 6.8 | $D_6$ | 1N4152 | $Q_6$ | 2N3414 |
| $R_2$ | 0.47 | $D_7$ | 1N4152 | $Q_7$ | 2N3414 |
| $R_3$ | 3.3 | $D_8$ | 1N4152 | $Q_8$ | 2N5354 |
| $R_4$ | 3.9 | $D_9$ | (1) | $Q_9$ | 2N3414 |

[1] Base emitter junction of 2N3390.

| | Ohms, K | Diodes | Type | Transistors | Type |
|---|---|---|---|---|---|
| Resistors: | | | | | |
| $R_5$ | 4.7 | | | $Q_{10}$ | 2N3414 |
| $R_6$ | 3.9 | | | $Q_{12}$ | 2N5354 |
| $R_7$ | .047 | | | $Q_{13}$ | 2N3414 |
| $R_8$ | 4.7 | | | | |
| $R_{21}$ | 2.2 | | | | |
| $R_{22}$ | 2.2 | | | | |

| Capacitors | Microfarads |
|---|---|
| C1 | .05–0.1 |
| C2 | .01–0.1 |
| **Bilateral switch** | **Type** |
| Q1 | 3N80 |
| Q2 | 3N80 |

Figure 5:
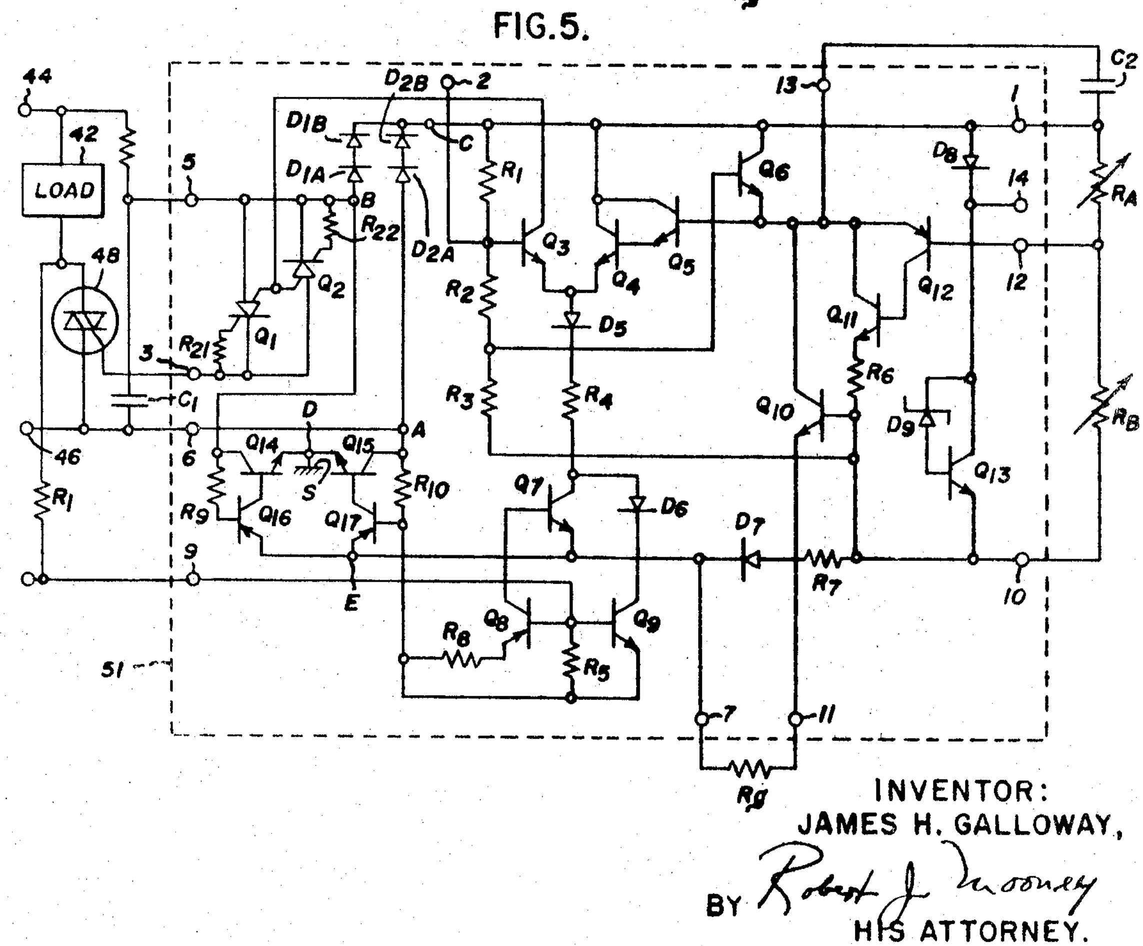
FIG. 5 is a schematic diagram of another exemplary embodiment of a semiconductor circuit constructed according to the present invention, and similar to the circuit of FIG. 3 but having almost all of its elements embodied in monolithic integrated form.
Figure 6:
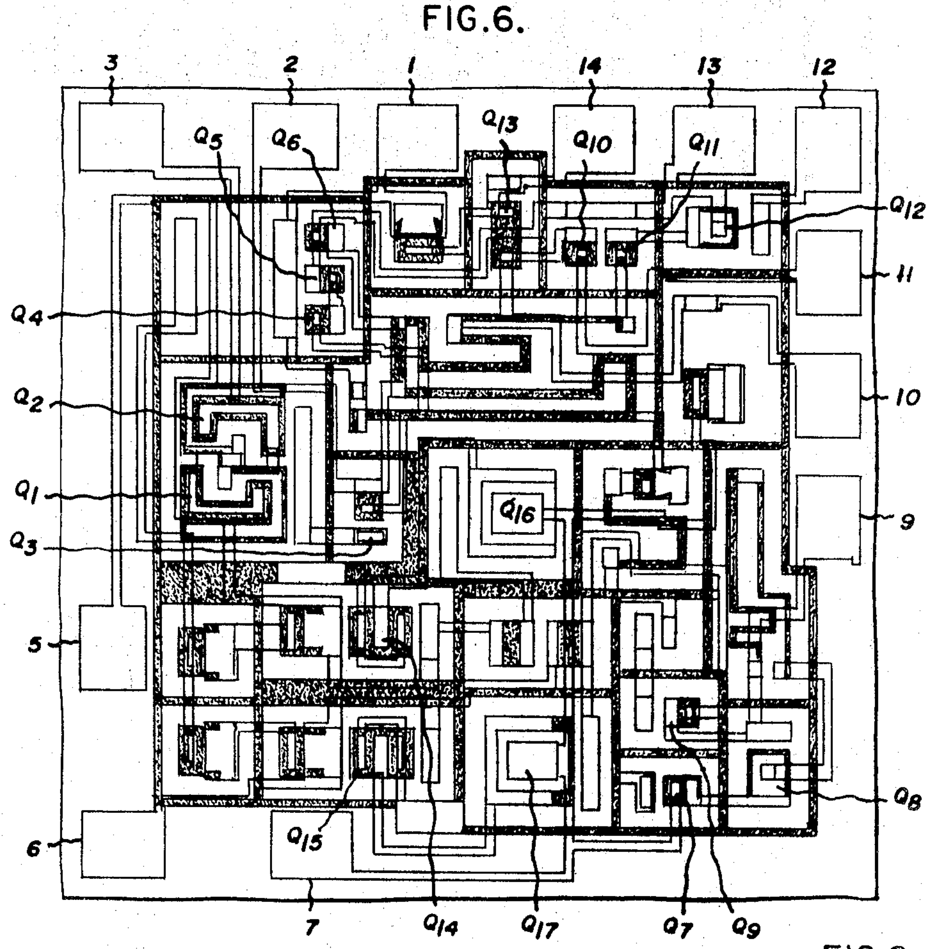
FIG. 6 is a plan view of the top surface of a silicon monolithic integrated circuit embodying the circuit elements shown within dotted line 51 of FIG. 5.

Shown in FIG. 5 is another embodiment of a circuit constructed according to the present invention, and similar to the circuit of FIG. 3, but in which all the elements except those which may require variation for different applications, are in monolithic integrated form. In the circuit of FIG. 5, all the elements corresponding to those of FIG. 3 within the dotted line 51 are provided in a monolithic integrated form, utilizing substrate isolation of a type well known to those skilled in the art and commonly called "back-biased junction diode isolation." With this type of isolation, as is well understood by those skilled in the art, the substrate region or portion of the monolithic integrated circuit is normally directly connected to the point in the circuit having the most extreme value of potential opposite in polarity to the substrate conductivity type. For example, a P-type conductivity substrate is normally directly connected to the most negative point in the circuit. Since the monolithic circuit of FIG. 5 works directly off the AC supplied to its terminals 5 and 6, however, the monolithic circuit of FIG. 5 has no single point which remains at the desired voltage extreme for convenient substrate isolation during the full 360° AC supply voltage cycle. This means that if the substrate were tied to a single point to create reverse bias diode isolation of the substrate, the isolation diodes would become forward biased during part of the AC supply voltage cycle, with resultant chaotic effects on circuit performance.

In the circuit of FIG. 5 this problem is solved, and substrate isolation effectively maintained during the full 360° AC supply voltage cycle, by replacement of diodes D3 and D4 of the full-wave rectifying bridge of FIG. 3 with a special substrate isolation control circuit, details of which will be hereinafter described. With the exception of this substrate isolation control circuit, the provision of an SBS-type bilateral switch at Q1 Q2 in place of the two SCS-type switches shown in FIG. 3, the addition of transistor Q11 to compensate for the low gain of PNP transistor Q12 when Q12 is of the lateral transistor type, and the substitution of four base-emitter diodes D1 A and B and D2 A and B for diodes D1 and D2, the remainder of the circuit of FIG. 5 is similar to corresponding portions of FIG. 3 and has accordingly been given the same reference characters as in FIG. 3. The SBS-type bilateral switch is described in detail in the Aug. 30, 1966 issue of "Electronic Design" magazine and in Section 4.14.4 of the GE SCR Manual Fourth Edition. Further detailed description of the circuit of FIG. 5 will therefore be limited to the substrate isolation control circuit and its operation.

The substrate isolation control circuit portion of the circuit of FIG. 5 is constituted by transistors Q14, Q15, Q16 and Q17, and resistors R9 and R10. The emitters of transistors Q14 and Q15 are connected in common with point D, which is directly connected to the monolithic circuit substrate shown schematically at S. The collector of transistor Q14 is connected to point B and terminal 5, and the collector of transistor Q15 is connected to point A and terminal 6. The base of Q14 connects to the collector of Q16 whose emitter connects to point E, and the base of Q15 connects to the collector of Q17 whose emitter connects to point E. Point E is connected to terminal 7, and is the DC negative point of the monolithic portion of the circuit of FIG. 5. Bias resistor R9 is connected between the collector of Q14 and base of Q16, and bias resistor R10 is connected between the collector of Q15 and base of Q17.

For purposes of discussion, assume the monolithic substrate is P-type and consider circuit terminal 5 to be positive. The input current from terminal 5 will then travel through diode D1, continue through the circuitry connected across terminals 1 and 10, and return via point E. As the return current passes through the emitter-base diode of transistor Q17 and reaches the base region of Q17, it will divide into two parts. One part will continue through the emitter-base junction of Q17, pass through $R_{10}$ and return to terminal 6 via point A, while the other part will pass through the collector-base junction of Q17 and act as the drive current to turn on Q15. Once Q15 turns on the drive, current will pass through the collector-base junction of Q15 and then continue on to circuit terminal 6. When in the conducting state, Q15 also acts as a current sink which absorbs all the reverse leakage current from the substrate S through the various continuous opposite-conductivity-type parts of the monolithic circuit, as well as leakage current through the reverse-biased emitter-base junction of Q14.

During the half-cycle of the AC supply when terminal 5 is positive relative to terminal 6, and point B is thus the most negative point in the circuit, point D and the substrate S are held by transistor Q15 at a voltage no farther above that of point B than the collector-to-emitter saturation voltage of Q15. Since this saturation voltage is about 0.2 volts, i.e. substantially less than the approximately 0.7 volts required for the substrate isolation diodes to become forward biased, the desired substrate isolation will be maintained and performance of the integrated circuit will not be deleteriously affected by injection of charge carriers from the substrate across any of the isolation diode PN junctions and creation of undesirable parasitic transistor action in the circuit. During conduction of transistor Q15, Q16 will have both its junctions reverse biased, thus preventing Q14 from turning on and shunting the supply current through Q14 and Q15.

During the other half-cycle of the AC supply when circuit terminal 5 is negative and terminal 6 is positive, Q14 and Q16 will conduct and thereby hold point D and substrate S at a potential no further above the potential of the most negative point in the integrated circuit, point B, than the saturation voltage drop of transistor Q14. $R_9$ and $R_0$, which may be, for example, about 100 ohms, compensate for the saturation resistance of the PNP and for the differences between the $V_{BE}$ of Q16 and Q17 and the $V_{BC}$ of Q14 and Q15, thus preventing the saturation voltage of either Q14 or Q15 from exceeding the threshold voltage of the substrate isolation diodes. In the event the substrate S is N-type, the polarities of the various transistors will, of course, be reversed but the mode of operation of the isolation control circuit will be as above described.

Thus with isolation control circuit shown, the substrate isolation diodes of the integrated circuit will never become forward biased at any time during the entire 360° cycle of the AC supply, even though a full-wave rectified output is provided at terminal 1 for energizing the remainder of the integrated circuit. The isolation control circuit above described is the subject of a U.S. Pat. application Ser. No. 733,344, filed May 31, 1968,now Pat No. 3,509,446,and assigned to the assignee of the present invention.

Figure 7:
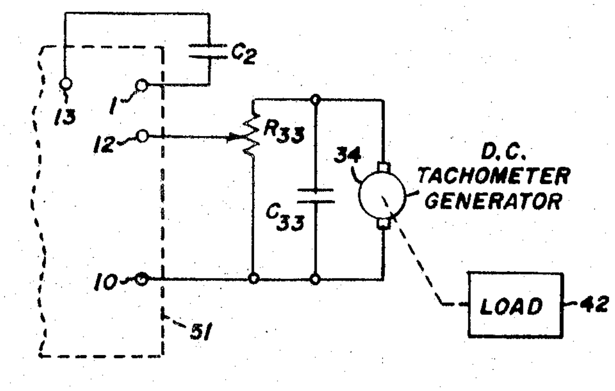
FIG. 7 is a fragmentary schematic diagram of a portion of the circuit of the FIG. 5 connected in a motor speed control application.

FIG. 7 shows an application of the circuit of FIG. 5 in which the output of a DC tachometer generator, coupled to an AC motor constituting load 42, provides the control signal voltage at terminal 12, in place of the voltage across $R_B$ in FIG. 5, for controlling the speed of the load motor 42. The output of tachometer generator 34 is ripple-filtered by capacitor C33 and a desired portion of this output voltage, determined by the speed setting of potentiometer R33, is applied across terminals 12 and 10 of the integrated circuit within dotted line 51.

Figure 8:
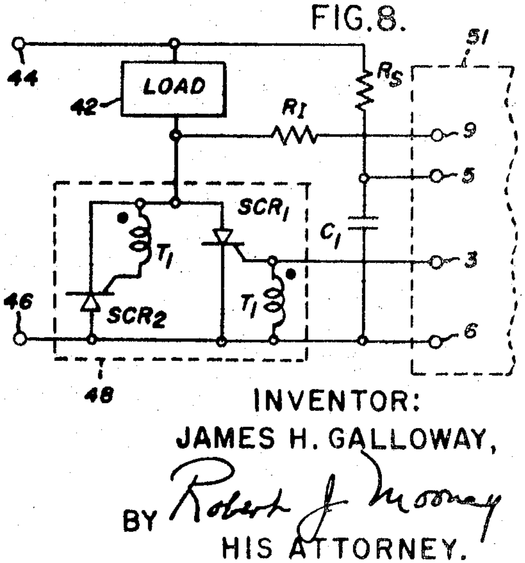
FIG. 8 is a fragmentary schematic diagram of a portion of the circuit of FIG. 5 connected and arranged to control triggering of a pair of inverse-parallel-connected unidirectional thyristors.

FIG. 8 shows another application of the circuit of FIG. 5 arranged to control firing of a switch 48 constituted by a pair of inverse-parallel-connected unidirectional thyristors SCR 1 and SCR 2 through a one-to-one pulse transformer T.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

I claim:

1. A semiconductor circuit for controlling the application of power from an alternating current supply to a load through a trigger-signal-actuated switch during a variable portion of each half-cycle of the AC supply determined by the magnitude of a variable control signal comprising:

a. magnitude-to-time converter circuit means including a differential amplifier and having control signal input terminals adapted to be connected to the control signal for generating in each half-cycle of the AC supply a keying signal at a phase angle relative to the beginning of the half-cycle determined by the magnitude of the control signal;

b. full wave rectifier circuit means adapted to be connected to said AC supply for generating and supplying to said converter circuit means a DC energizing voltage which drops to zero at the end half-cycle of the AC supply; and c. means for triggering the trigger-signal-actuated switch responsive to the generation of said keying signal.

2. The circuit defined in claim 1 wherein said magnitude-to-time converter circuit means includes a ramp-and-pedestal circuit comprising a pedestal voltage generator portion for generating a pedestal voltage responsive to the magnitude of the control signal, a ramp voltage generator portion for generating in each half-cycle of the AC supply a cosine-shaped ramp voltage having an amplitude which increases with time during each half-cycle of the AC supply, a reference voltage generator circuit portion, and a comparator circuit portion supplied by the output of the reference voltage generator circuit and the ramp-and-pedestal circuit for generating the keying signal in each half-cycle of the AC supply responsive to the ramp-and-pedestal a voltage reaching a predetermined relationship with the reference voltage.

3. A semiconductor circuit for controlling the application of power from an AC supply to a load during a variable portion of each half-cycle of the AC supply determined by the magnitude of a variable control signal comprising:

a. magnitude-to-time converter circuit means including a differential amplifier and having control signal input terminals adapted to be connected to the control signal for generating in each half-cycle of the AC supply a keying signal at a phase angle relative to the beginning of the half-cycle determined by the magnitude of the control signal;

b, trigger-signal-generating means responsive to a keying signal from said magnitude-to-time converter circuit for generating a trigger signal; and c. a trigger-signal-actuated switch connected between the load and the AC supply and having its trigger-signal-responsive portion connected to the output of the trigger-signal-generating means.

4. A semiconductor control circuit for controlling the application of power from an AC supply to a load through a trigger-signal-actuated switch during a variable portion of each half-cycle of the AC supply determined by the magnitude of a variable control signal comprising;

a. magnitude-to-time converter circuit means including a differential amplifier and having control signal input terminals adapted to be connected to the control signal for generating in each half-cycle of the AC supply a keying signal at a phase angle relative to the beginning of the half-cycle determined by the magnitude of the control signal;
b. trigger-signal-generating means responsive to a keying signal from said magnitude-to-time converter circuit for generating a trigger signal;
c. AC supply terminals adapted to be connected to the alternating current supply;
d. full-wave rectifier circuit means connected to said AC supply terminals for generating and supplying to the remainder of said control circuit a full-wave rectified energizing voltage which drops to zero at the end of each half-cycle of the AC supply; and
e. means connecting the output of the trigger-signal-generating means to an output terminal adapted to be connected to the trigger-signal-actuated switch.

5. The circuit defined in claim 5 wherein ramp-and-pedestal magnitude-to-time converter circuit means includes a ramp-and-pedestal circuit comprising a pedestal voltage generator portion for generating a pedestal voltage responsive to the magnitude of the control signal, a ramp voltage generator portion for generating in each half-cycle of the AC supply a cosine-shaped ramp voltage having an amplitude which increases with time during each half-cycle of the AC supply, a reference voltage generator circuit portion, and a comparator circuit portion supplied by the output of the reference voltage generator circuit and the ramp-and-pedestal circuit for generating a key signal in each half-cycle of the AC supply responsive to the ramp-and-pedestal a voltage reaching a predetermined relationship with the reference voltage.

6. The circuit defined in claim 5 wherein at least said full-wave rectifier circuit means and a portion of said magnitude-to-time converter circuit means are embodied in a monolithic integrated semiconductor body including a substrate, said substrate being separated from each of the remaining portions of the integrated circuit by PN junction isolation diodes and adapted to be isolated from said remaining portions by reverse bias of said isolation diodes, and isolation control circuit means responsive to alterations in polarity of said AC supply for preventing said isolation diodes from becoming forward biased.

7. A semiconductor circuit for controlling the application of power from an AC supply to a load through a trigger-signal-actuated switch during a variable portion of each half-cycle of the AC supply determined by the magnitude of a variable control signal comprising:

magnitude-to-time converter circuit means having control signal input terminals adapted to be connected to the control signal for generating in each half-cycle of the AC supply a keying signal at a phase angle relative to the beginning of the half-cycle determined by the magnitude of the control signal;
full-wave rectifier circuit means adapted to be connected to said AC supply for generating and supplying to said converter circuit means a DC energizing voltage which drops to zero at the end of each half-cycle of the AC supply;
means for triggering the trigger-signal-actuated switch responsive to the generation of said keying signal; and
lockout circuit means for preventing generation of the keying signal responsive to a predetermined voltage across the switch.

8. A semiconductor circuit for controlling the application of power from an AC supply to a load during a variable portion of each half-cycle of the AC supply determined by the magnitude of a variable control signal comprising;

magnitude-to-time converter circuit means having control signal input terminals adapted to be connected to the control signal for generating in each half-cycle of the AC supply a keying signal at a phase angle relative to the beginning of the half-cycle determined by the magnitude of the control signal;
trigger-signal-generating means responsive to a keying signal from said magnitude-to-time converter circuit for generating a trigger signal;
a trigger-signal-actuated switch connected between the load and the AC supply and having its trigger-signal-responsive portion connected to the output of the trigger-signal-generating means; and
lockout circuit means for preventing generation of the keying signal responsive to a predetermined voltage across the switch.

9. A semiconductor circuit for controlling the application of power from an AC supply to a load through a trigger-signal-actuated switch during a variable portion of each half-cycle of the AC supply determined by the magnitude of a variable control signal comprising:

magnitude-to-time converter circuit means having control signal input terminals adapted to be connected to the control signal for generating in each half-cycle of the AC supply a keying signal at a phase angle relative to the beginning of the half-cycle determined by the magnitude of the control signal;
full-wave rectifier circuit means adapted to be connected to said AC supply for generating and supplying to said converter circuit means a DC energizing voltage which drops to zero at the end of each half-cycle of the AC supply;
means for triggering the trigger-signal-actuated switch responsive to the generation of said keying signal; and
at least said full-wave rectifier circuit means and a portion of said magnitude-to-time converter circuit means being embodied in a monolithic integrated semiconductor body including a substrate, said substrate being separated from each of the remaining portions of the integrated circuit by PN junction isolation diodes and adapted to be isolated from said remaining portions by reverse bias of said isolation diodes, and isolation control circuit means responsive to alterations in polarity of said AC supply for preventing said isolation diodes from becoming forward biased.

10. A semiconductor circuit for controlling the application of power from an AC supply to a load during a variable portion of each half-cycle of the AC supply determined by the magnitude of a variable control signal comprising:

magnitude-to-time converter circuit means having control signal input terminals adapted to be connected to the control signal for generating in each half-cycle of the beginning of the half-cycle determined by the magnitude of the control signal;
trigger-signal-generating means responsive to a keying signal from said magnitude-to-time converter circuit for generating a trigger signal;
a trigger-signal-actuated switch connected between the load and the AC supply and having its trigger-signal-responsive portion connected to the output of the trigger-signal-generating means; and
at least said trigger-signal-generating means and a portion of said magnitude-to-time converter circuit means being embodied in a monolithic integrated semiconductor body including a substrate, said substrate being separated from each of the remaining portions of the integrated circuit by PN junction isolation diodes and adapted to be isolated from said remaining portions by reverse bias of said isolation diodes, and isolation control circuit means responsive to alterations in polarity of said AC supply for preventing said isolation diodes from becoming forward biased.

11. A semiconductor control circuit for controlling the application of power from an AC supply to a load through a trigger-signal-actuated switch during a variable portion of each half-cycle of the AC supply determined by the magnitude of a variable control signal comprising:

magnitude-to-time converter circuit means having control signal input terminals adapted to be connected to the control signal for generating in each half-cycle of the AC supply a keying signal at a phase angle relative to the beginning of the half-cycle determined by the magnitude of the control signal;

trigger-signal-generating means responsive to a keying signal from said magnitude-to-time converter circuit for generating a trigger signal;

AC supply terminals adapted to be connected to the AC supply;

full wave rectifier circuit means connected to said AC supply terminals for generating and supplying to the remainder of said control circuit a full-wave rectified energizing voltage which drops to zero at the end of each half-cycle of the AC supply;

means connecting the output of the trigger-signal-generating means to an output terminal adapted to be connected to the trigger-signal-actuated switch; and at least said full-wave rectifier circuit means and a portion of said magnitude-to-time converter circuit means being embodied in a monolithic integrated semiconductor body including a substrate, said substrate being separated from each of the remaining portions of the integrated circuit by PN junction isolation diodes and adapted to be isolated from said remaining portions by reverse bias of said isolation diodes, and isolation control circuit means responsive to alterations in polarity of said AC supply for preventing said isolation diodes from becoming forward biased.

UNITED STATES PATENT OFFICE

CERTIFICATE OF CORRECTION

Patent No. 3,558,922 Dated January 26, 1971

Inventor(s) James H. Galloway

It is certified that error appears in the above-identified patent and that said Letters Patent are hereby corrected as shown below:

Column 9, line 26, "claim 5 wherein ramp-and-pedestal" should read -- claim 4 wherein said --.

Signed and sealed this 25th day of May 1971.

(SEAL)
Attest:

EDWARD M.FLETCHER,JR.
Attesting Officer

WILLIAM E. SCHUYLER, JR.
Commissioner of Patents